US009319478B2

(12) United States Patent
Chinnadurai et al.

(10) Patent No.: US 9,319,478 B2
(45) Date of Patent: *Apr. 19, 2016

(54) VEHICLE COMMUNICATIONS INTERFACE AND METHOD OF OPERATIONS THEREOF

(71) Applicant: Bosch Automotive Service Solutions Inc., Warren, MI (US)

(72) Inventors: Manokar Chinnadurai, Owatonna, MN (US); Paul Sontheimer, Waseca, MN (US)

(73) Assignee: Bosch Automotive Service Solutions Inc., Warren, MI (US)

( * ) Notice: Subject to any disclaimer, the term of this patent is extended or adjusted under 35 U.S.C. 154(b) by 423 days.

This patent is subject to a terminal disclaimer.

(21) Appl. No.: 13/626,155

(22) Filed: Sep. 25, 2012

(65) Prior Publication Data

US 2013/0019043 A1  Jan. 17, 2013

Related U.S. Application Data

(63) Continuation of application No. 12/483,345, filed on Jun. 12, 2009, now Pat. No. 8,275,513.

(51) Int. Cl.
*G06F 7/00* (2006.01)
*H04L 29/08* (2006.01)
*G06F 9/44* (2006.01)
*H04L 29/06* (2006.01)
*G06F 9/54* (2006.01)

(52) U.S. Cl.
CPC ............. *H04L 67/2823* (2013.01); *G06F 8/30* (2013.01); *G06F 9/541* (2013.01); *G06F 9/545* (2013.01); *H04L 67/12* (2013.01); *H04L 69/08* (2013.01); *H04L 69/18* (2013.01)

(58) Field of Classification Search
CPC ........... G06F 8/30; G06F 9/545; G06F 9/541; H04L 67/2823; H04L 67/12; H04L 69/18; H04L 9/541; H04L 69/08
USPC ..................... 701/1, 36, 29.1, 31.5
See application file for complete search history.

(56) References Cited

U.S. PATENT DOCUMENTS 7,334,041 B2  2/2008  Swindells et al.
7,612,528 B2  11/2009  Baarman et al.
(Continued)

FOREIGN PATENT DOCUMENTS

CN       1507557 A      6/2004
WO       9922301 A1     5/1999
WO       2007117370 A1  10/2007

OTHER PUBLICATIONS

International Search Report & Written Opinion for PCT/US2010/38337, Jul. 25, 2010.
(Continued)

*Primary Examiner* — Kim T Nguyen
(74) *Attorney, Agent, or Firm* — Baker Hostetler LLP

(57) ABSTRACT

A vehicle communication interface (VCI) that allows for a single communications protocol to be used between a software application and a plurality of software drivers that are connected to physical interfaces of the VCI. Also, a method of communicating with a vehicle using a host system such as a personal computer. The method also makes use of a single communications protocol between a software application that processes information received from a vehicle and a plurality of software drivers.

19 Claims, 3 Drawing Sheets

(56) References Cited

U.S. PATENT DOCUMENTS

| | | |
|---|---|---|
| 8,275,513 B2 * | 9/2012 | Chinnadurai et al. .......... 701/36 |
| 2005/0193087 A1 | 9/2005 | Swindells et al. |
| 2005/0193252 A1 * | 9/2005 | Cancilla et al. ................ 714/29 |
| 2008/0001572 A9 * | 1/2008 | Baarman et al. ............. 320/108 |

OTHER PUBLICATIONS

International Supplementary Search Report for EP10786916.6 Filed Jun. 11, 2010.

Chinese Office Action issued Oct. 8, 2014 for CN201080025461.4 filed Jun. 11, 2010.

* cited by examiner

VEHICLE COMMUNICATIONS INTERFACE AND METHOD OF OPERATIONS THEREOF

CROSS-REFERENCE TO RELATED APPLICATIONS

This application claims priority to and is a Continuation of application Ser. No. 12/483,345, filed on Jun. 12, 2009, entitled "Vehicle Communications Interface and Method of Operations Thereof," the disclosure of which is hereby incorporated by reference in its entirety.

FIELD OF THE INVENTION

The present invention relates generally to systems and devices designed to communicate with electronically controlled systems located within vehicles. The present invention also relates generally to methods for communicating with such electronically controlled systems.

BACKGROUND OF THE INVENTION

Currently available vehicle communication interface (VCI) devices allow for communication between one or more electronically controlled systems in a vehicle (e.g. an automobile) and a host system outside of the vehicle (e.g., a personal computer). The manner in which a VCI allows for such communication is by effectively "translating" between communications protocols used by the systems in the vehicle and the communications protocol used by the host system outside of the vehicle.

In practice, a currently available VCI allows, for example, for the anti-lock braking system (ABS) and/or transmission system of an automobile to communicate with a personal computer that is implementing automotive diagnostic software. More specifically, the VCI translates between automotive communications protocols (e.g., the Controller Area Network (CAN) protocol, the ISO 9141 protocol, the CCD protocol, the Digital Command Language (DCL protocol) and/or the J1850 protocol) and a protocol used by the personal computer (e.g., the RS232 protocol, the Universal Serial Bus (USB) protocol, the Ethernet protocol, the Bluetooth® protocol and/or the WiFi™ protocol). Such translation allows for data and/or commands to be transmitted between the automotive system(s) and the personal computer. In turn, this also allows for the diagnosis of one or more of the automotive systems to be performed using the computer.

As mentioned above, host systems (e.g. personal computers) use a plurality of communications protocols. As such, some currently available VCI devices include a plurality of physical sockets that are designed to be connected to one or more ports of a host system. For example, some currently available VCI devices have an RS232 socket, a USB socket, an Ethernet socket, a Bluetooth® socket and a WiFi™ socket. In turn, each of these sockets has an associated software driver located within the VCI.

Currently available VCI devices also include one or more software applications, many of which are capable of performing at least some degree of processing on of the data received from systems in a vehicle. In order for these software applications to communicate with the software drivers associated with each of the physical sockets included in a VCI, a separate application interface is needed between the application and each software driver. Since each application interface has to be programmed separately, the complexity and cost of manufacturing a VCI device increases with each additional application interface.

SUMMARY OF THE INVENTION

At least in view of the above, it would be desirable to provide novel vehicle communication interface (VCI) devices that minimizes the number of application interfaces included between a software application found within the VCI and a plurality of software drivers that facilitate communication with an exterior host system. It would also be desirable to provide novel, more cost-effective methods for allowing exterior host systems to communicate with a vehicle using a VCI.

The foregoing needs are met, to a great extent, by one or more embodiments of the present invention. According to one such embodiment, a VCI is provided. The VCI includes a software application configured to process data received from a vehicle. The VCI also includes a first driver configured to communicate with a first host system interface using a first communications protocol. The VCI further includes a second driver configured to communicate with a second host system interface using a second communications protocol. In addition, the VCI also includes a standardized interface configured to communicate with each of the application, the first driver and the second driver using a third communications protocol.

In accordance with another embodiment of the present invention, a method of communicating with a vehicle is provided. The method includes processing information received from a vehicle using a software application. The method also includes communicating with a first host system interface using a first driver and a first communications protocol. The method further includes communicating with a second host system interface using a second driver and a second communications protocol. In addition, the method also includes communicating with the application, the first driver and the second driver using a standardized interface and a third communications protocol.

In accordance with yet another embodiment of the present invention, another VCI is provided. The VCI includes means for processing information received from a vehicle. The VCI also includes means for communicating with a first host system interface using a first communications protocol. The VCI further includes means for communicating with a second host system interface using a second communications protocol. In addition, the VCI also includes means for communicating with the means for processing, the means for communicating with the first host system interface and the means for communicating with the second host system interface using a third communications protocol.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

Figure 1:
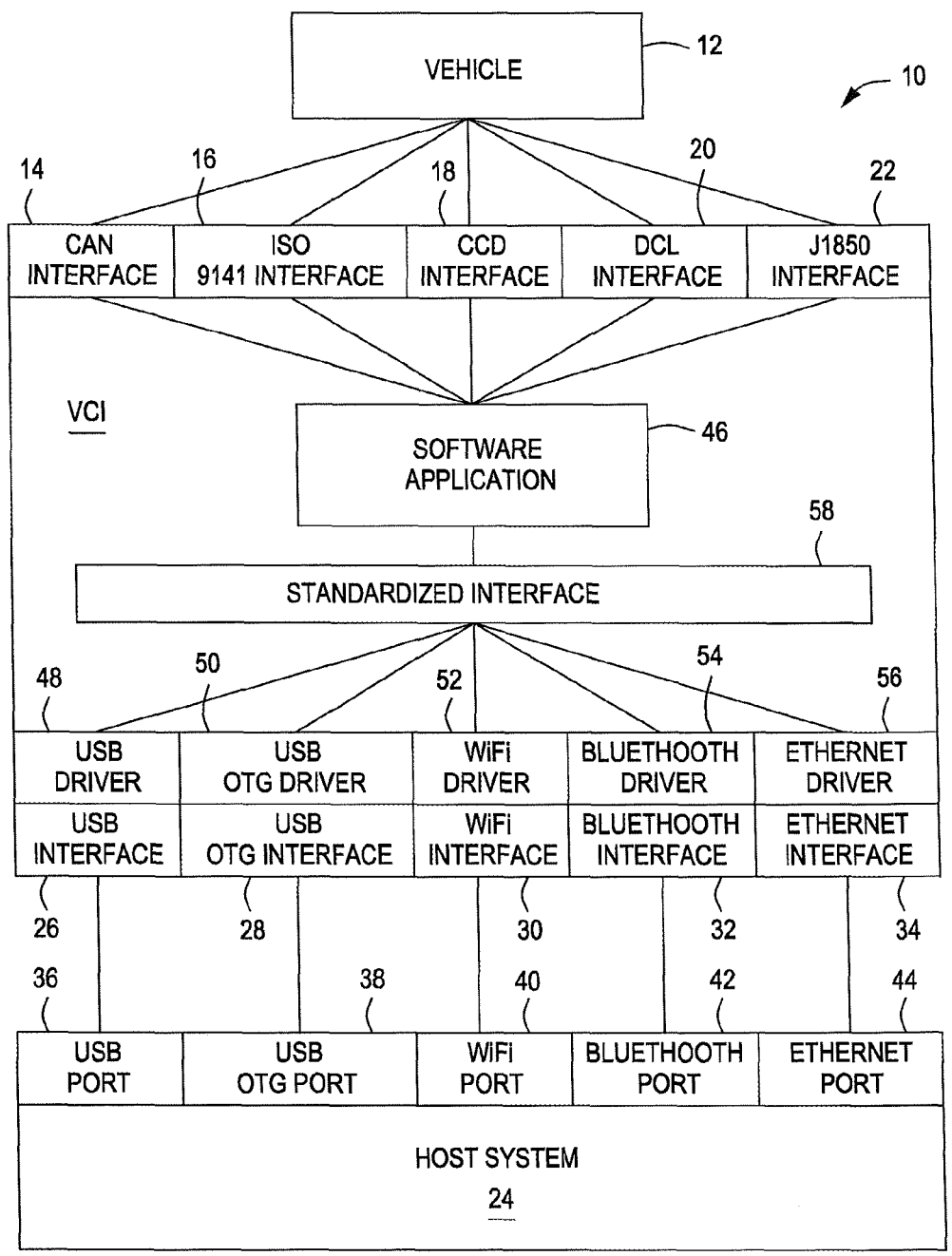
FIG. 1 is a schematic diagram of a vehicle communication interface (VCI) according to an embodiment of the present invention wherein the VCI is connected to a vehicle and a host system.

The invention will now be described with reference to the drawing figures, in which like reference numerals refer to like parts throughout. FIG. 1 is a schematic diagram of a vehicle communication interface (VCI) 10 according to an embodiment of the present invention. As illustrated in FIG. 1, the VCI 10 is connected to a vehicle 12 through a plurality of vehicular interfaces 14, 16, 18, 20, 22 and to a host system 24 through a plurality of host system interfaces 26, 28, 30, 32, 34. More specifically, the host system interfaces 26, 28, 30, 32, 34 are connected, either physically or wirelessly, to a plurality of ports 36, 38, 40, 42, 44 in the host system 24.

Although the CAN, ISO 9141, CCD, DCL and J1850 protocols are illustrated in FIG. 1 as being used by the vehicular interfaces 14, 16, 18, 20, 22, other protocols may also be used by one or more of the interfaces according to certain embodiments of the present invention. Also, although the USB, USB On-The-Go (OTG), WiFi™, Bluetooth® and Ethernet protocols are illustrated in FIG. 1 as being used by the host system interfaces 26, 28, 30, 32, 34, the use of other protocols by one or more of these interfaces is also within the scope of certain embodiments of the present invention.

In addition to the components listed above, the VCI 10 illustrated in FIG. 1 also includes a software application 46, a plurality of software drivers 48, 50, 52. 54, 56 and a standardized interface 58 that operates between the software application 46 and software drivers 48, 50, 52, 54, 56. Although not explicitly illustrated in FIG. 1, the software application 46, software drivers 48, 50, 52, 54, 56 and standardized interface 58 may all be implemented on one or more processors and/or memory storage location(s) that may be included within the VCI 10.

The software application 46 is configured to process data received from the vehicle 12 through one of the vehicular interfaces 14, 16, 18, 20, 22 of the VCI 10. For example, the software application 46 can translate data received from the vehicle's antilock braking system into a signal that the host system 24 can recognize as being indicative of a malfunction in the brakes.

According to certain embodiments of the present invention, after the software application 46 has processed the data received from the vehicle 12, the data is forwarded on to the standardized interface 58. Since the standardized interface 58 is configured to communicate with the software application 46 and each of the software drivers 48, 50, 52, 54, 56, this communication typically takes place using a single protocol. In the embodiment of the present invention illustrated in FIG. 1, the protocol used is the Transmission Control Protocol/Internet Protocol (TCP/IP) protocol. However, other protocols may also be used.

Because the host system interfaces 26, 28, 30, 32, 34 are typically not configured to communicate with the host system 24 using the TCP/IP protocol, each of the software drivers 48, 50, 52, 54, 56 is typically configured to communicate with the host system interface to which it is connected using another communications protocol. For example, while the leftmost software driver 48 and rightmost software driver 56 illustrated in FIG. 1 both communicate with the standardized interface 58 using the TCP/IP protocol, the leftmost software driver 48 is configured to communicate with the leftmost host system interface 26 using the USB protocol while the rightmost software driver 56 is configured to communicate with the rightmost host system interface 34 using the Ethernet protocol.

According to certain embodiments of the present invention, the standardized interface 58 is configured to assign an IP address to the host system 24 that is electronically connected to at the one of the host system interfaces 26, 28, 30, 32, 34. This allows for the above-discussed TCP/IP protocol to be implemented.

As illustrated in FIG. 1, some of the host system interfaces (e.g., USB interface 26, USB OTG interface 28 and Ethernet interface 34) are configured to be physically connected to the host system 24. Such physical connection may be established, for example, using a cable. As also illustrated in FIG. 1, some of the host system interfaces (e.g., WiFi™ interface 30 and Bluetooth® interface 32) are configured to communicate wirelessly with the host system 24.

According to certain embodiments of the present invention, the communications protocol used between a first software driver and a first host system interface differs from the communications protocol used between a second software driver and a second host system interface. For example, communications protocols used within the VCI can include two or more of the RS232 protocol, the USB protocol, the USB OTG protocol, the Ethernet protocol, the Bluetooth® protocol and the WiFi™ protocol. Of course, the use of other communications protocols is also within the scope of the present invention.

Figure 2:
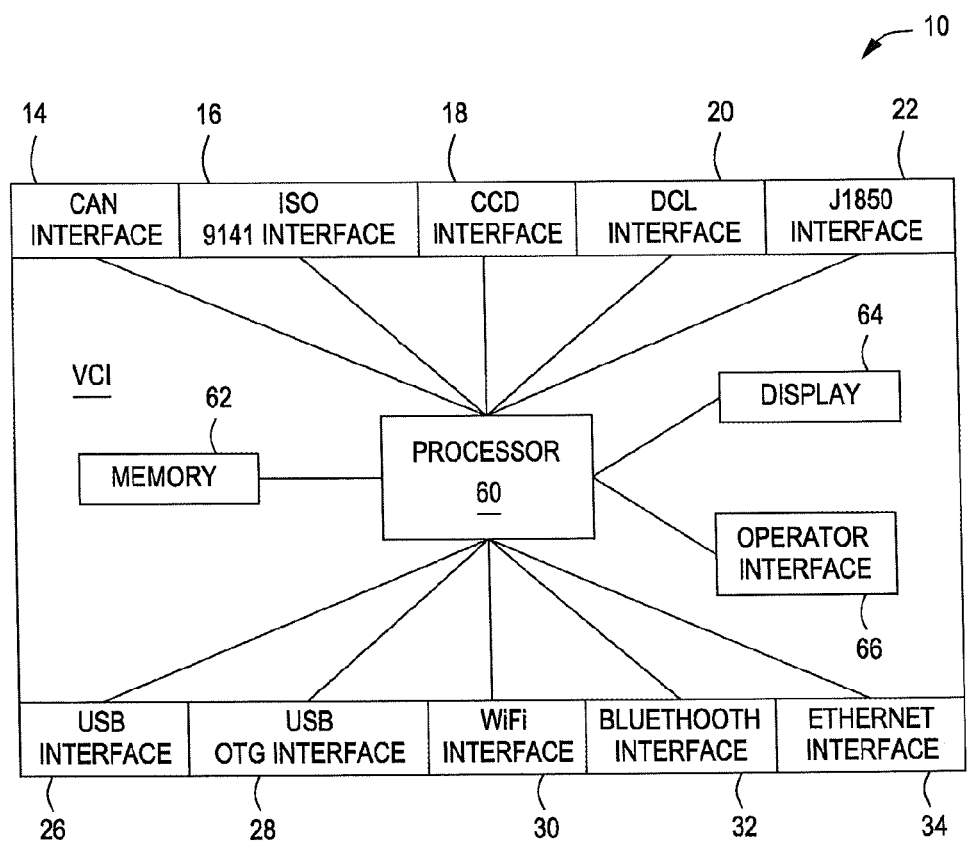
FIG. 2 is a schematic diagram of physical components included within the VCI illustrated in FIG. 1 according to an embodiment of the present invention.

FIG. 2 is a schematic diagram of physical components included within the VCI 10 illustrated in FIG. 1 according to an embodiment of the present invention. More specifically, FIG. 2 illustrates that VCI 10 includes not only the vehicular interfaces 14, 16, 18, 20, 22 and host system interfaces 26, 28, 30, 32, 34 discussed above but also a processor 60, memory 62, a display 64 and an operator interface 66. In this embodiment of the present invention, the software application 46 and software drivers 48, 50, 52, 54, 56 are implemented using the processor 60 and, if necessary, may be partially or completely stored in the memory 62. Although not included in all VCI devices according to the present invention, the display 64 and operator interface 66 may, for example, allow an operator to see the status of the VCI 10, may obtain information from the software application 46 and/or may allow for an operator to provide input to the VCI 10 using, for example, a touch screen or keypad as the operator interface 66.

Figure 3:
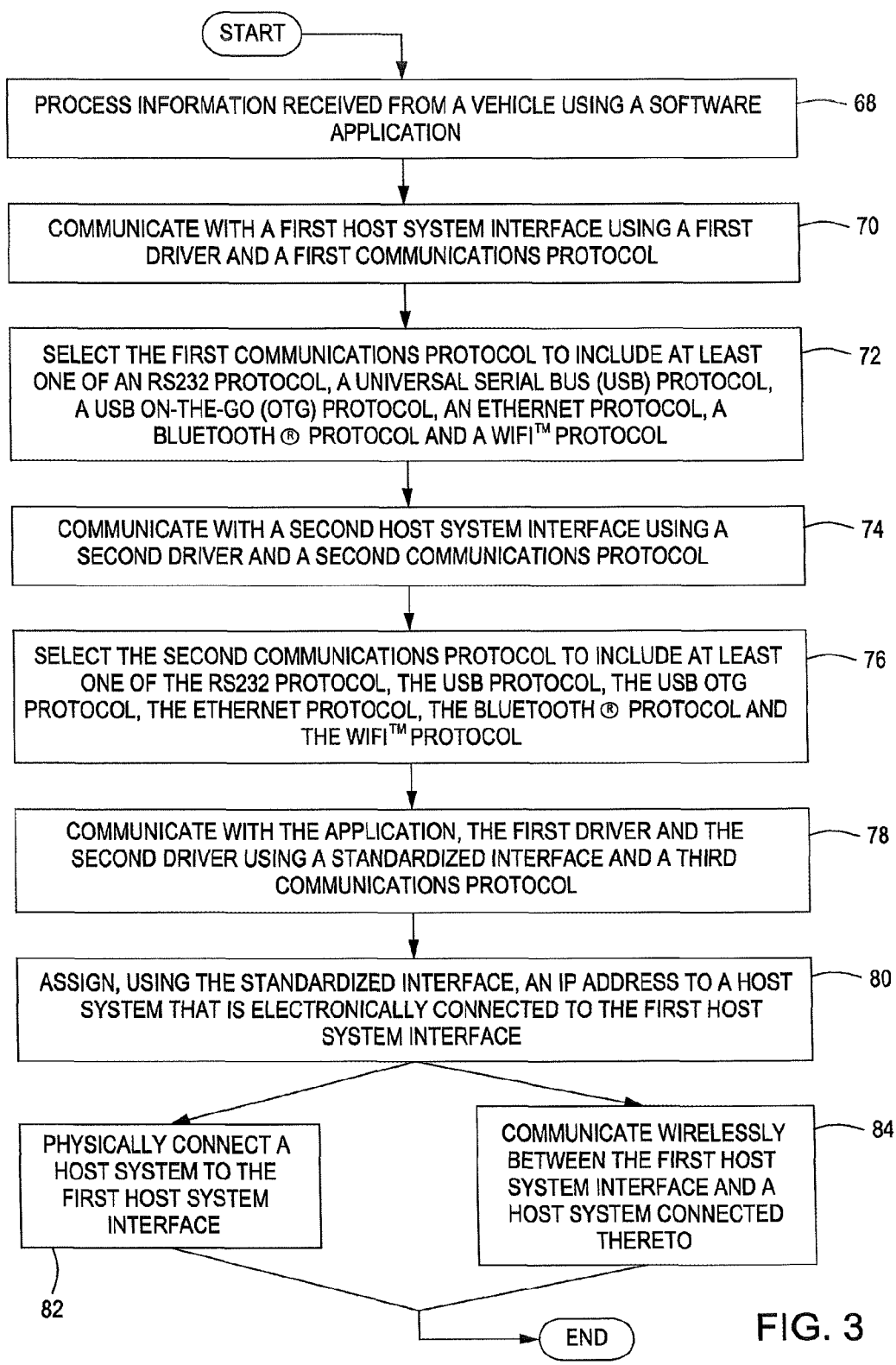
FIG. 3 is a flowchart illustrating steps of a method of communicating with a vehicle according to an embodiment of the present invention.

FIG. 3 is a flowchart illustrating steps of a method of communicating with a vehicle according to an embodiment of the present invention. Step 68 of the flowchart specifies processing information received from a vehicle using a software application. According to certain embodiments of the present invention, the information is received from an electronic system in an automobile such as, for example, the transmission system, the fuel injection system and the cruise control system. The information may include, for example, error messages related to one or more of the vehicle's systems, vehicular system operating parameters (e.g., rpm information, temperature, current or voltage levels, etc.) When this step is implemented using the VCI 10 illustrated in FIG. 1, the information comes into the VCI through one or more of the vehicular interfaces 14, 16, 18, 20, 22 and is processed using the software application 46.

Step 70 in FIG. 3 specifies communicating with a first host system interface using a first driver and a first communications protocol. This step may be implemented, for example, by wirelessly sending at least a portion of the information mentioned in step 68 from the software application 46 illustrated in FIG. 1 to the host system 24 through the WiFi software driver 52 and WiFi physical interface 30 using the WiFi protocol.

Next, step 72 specifies selecting the first communications protocol to include at least one of the RS232 protocol, the USB protocol, the USB OTG protocol, the Ethernet protocol, the Bluetooth® protocol and the WiFI™ protocol. When implementing this step using the VCI 10 illustrated in FIG. 1, the selection of the communications protocol depends upon which host system interface is used. For example, if the VCI 10 is connected to an Ethernet port of the host system 24, the Ethernet protocol will be selected.

Step 74 in FIG. 3 specifies communicating with a second host system interface using a second driver and a second communications protocol. This step may be implemented, for example, by sending at least a portion of the information mentioned in step 68 from the software application 46 illustrated in FIG. 1 to the host system 24 through the USB software driver 48 and the USB physical interface 26 using the USB protocol and a cable that connects the USB interface 26 to the USB port 36 of the host system.

According to step 76 of the flowchart illustrated in FIG. 3, the second communications protocol is selected to include at least one of the RS232 protocol, the USB protocol, the USB OTG protocol, the Ethernet protocol, the Bluetooth® protocol and the WiFI™ protocol. According to certain embodiments of the present invention the first communications protocol and the second communications protocol are selected as being different from each other. For example, if the first communications protocol is selected to be the RS232 protocol, the second communications protocol may be selected to be the RS232 protocol.

As with the implementation of step 72, the selection of the communications protocol in step 76 depends upon which host system interface is used. Once implemented, however, steps 72 and 76 allow for the VCI 10 illustrated in FIG. 1 to be connected to different ports of host systems. For example, the VCI 10 may be connected to one PC wirelessly using Bluetooth® and may be connected to another the USB port of another PC through a cable. Typically, a VCI according to the present invention is connected to only one host system at a time. However, connection of the VCI to multiple host systems is also within the scope of the present invention.

Step 78 of the flowchart illustrated in FIG. 3 specifies communicating with the application, the first driver and the second driver using a standardized interface and a third communications protocol. When implementing this step, the third communications protocol is chosen to include the TCP/IP protocol according to certain embodiments of the present invention. According to some of these embodiments, step 80 specifies assigning, using the standardized interface, and IP address to a host system that is electronically connected to the first post to system interface.

When implementing steps 78 and 80 of the flowchart illustrated in FIG. 3 using the VCI 10 illustrated in FIG. 1, the information received from the vehicle 12 is received by the software application 46 through one of the vehicular interfaces 14, 16, 18, 20, 22 using the communications protocol used by the electronic vehicular system communicating with the VCI 10 (e.g., the CAN protocol, the ISO 9141 protocol, the CCD protocol, the DCL protocol, the J1850 protocol, etc.). The information is then passed on to the software application 46, sometimes using one or more software drivers (not illustrated) that may be positioned between the vehicular interface 14, 16, 18, 20, 22 and the software application 46.

Once received in the software application 46, the information is processed and forwarded by the software application 46 to the standardized interface 58 using the TCP/IP protocol. Then, the standardized software application 46 forwards the processed information to one or more of the software drivers 48, 50, 52, 54, 56 using the TCP/IP protocol, which in turn forward the information to their associated host system interfaces 26, 28, 30, 32, 34 and ultimately to the host system 24.

One advantage of the above-discussed devices and methods is that, instead of having to include and separately develop a separate software driver for each host system interface, a single standardized interface is used to relay information between a software application and all of the software drivers. This reduces the overall complexity and cost of the VCI and method of communication.

Returning to FIG. 3, step 82 specifies physically connecting a host system to the first host system interface. As an alternative, step 84 specifies communicating wirelessly between the first host system interface and a host system connected thereto. Typically, either step 82 or step 84 is selected when implementing methods according to the present invention. However, it is also within the scope of the present invention to perform steps 82 and 84 together or one after another if connections to multiple host systems is desirable.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

The invention claimed is:

1. A vehicle communication interface (VCI), comprising:
a software application configured to process data received from a vehicle via one or more vehicle interfaces;
a first driver configured to communicate with a first host system interface of a host system using a first communications protocol;
a second driver configured to communicate with a second host system interface of the host system using a second communications protocol;
a processor that implements the software application, the first driver and the second driver; and an operator interface; and
a standardized interface configured to communicate with each of the software application, the first driver and the second driver using a third communications protocol.

2. The VCI of claim 1, wherein the third communications protocol is Transmission Control Protocol/Internet Protocol (TCP/IP).

3. The VCI of claim 1, wherein the standardized interface is further configured to assign an IP address to the host system that is electronically connected to the first host system interface and the second host system interface.

4. The VCI of claim 1, wherein the first host system interface is configured to be physically or wirelessly connected to the host system.

5. The VCI of claim 1, wherein the first communications protocol comprises at least one of an RS232 protocol, a Universal Serial Bus (USB) protocol, a USB On-The-Go (OTG) protocol, an Ethernet protocol, a Bluetooth® protocol and a WiFi™ protocol.

6. The VCI of claim 5, wherein the second communications protocol comprises at least one of the RS232 protocol, the USB protocol, the USB OTG protocol, the Ethernet protocol, the Bluetooth® protocol and the WiFi™ protocol.

7. The VCI of claim 6, wherein the first communications protocol, the second communications protocol and the third communications protocol are not the same.

8. A method of communicating with a vehicle, the method comprising:
processing, using a software application and a processor, information received from the vehicle via one or more vehicle interfaces;
communicating with a first host system interface of a host system using a first driver and a first communications protocol;
communicating with a second host system interface of the host system using a second driver and a second communications protocol; and
communicating with the software application, the first driver and the second driver using a standardized interface and a third communications protocol.

9. The method of claim 8, wherein the third communications protocol comprises Transmission Control Protocol/Internet Protocol (TCP/IP).

10. The method of claim 8, further comprising:
assigning, using the standardized interface, an IP address to the host system that is electronically connected to the first host system interface and the second host system interface.

11. The method of claim 8, further comprising:
connecting the host system to the first host system interface.

12. The method of claim 8, further comprising:
communicating wirelessly between the first host system interface and the host system.

13. The method of claim 8, further comprising:
selecting the first communications protocol to comprise at least one of an RS232 protocol, a Universal Serial Bus (USB) protocol, a USB On-The-Go (OTG) protocol, an Ethernet protocol, a Bluetooth® protocol and a WiFi™ protocol.

14. The method of claim 13, further comprising:
selecting the second communications protocol to comprise at least one of the RS232 protocol, the USB protocol, the USB OTG protocol, the Ethernet protocol, the Bluetooth® protocol and the WiFi™ protocol.

15. The method of claim 14, wherein the first communications protocol, the second communications protocol and the third communications protocol are different from each other.

16. A vehicle communication interface (VCI), comprising:
a software application configured to process information received from a vehicle via one or more vehicle interfaces;
a processor to implement the software application;
a first driver configured to communicate with a first host system interface of a host system using a first communications protocol;
a second driver configured to communicate with a second host system interface of the host system using a second communications protocol; and
a standardized interface configured to communicate with the software application, the first driver and the second driver using a third communications protocol, wherein the standardized interface operates between software application and the first and second drivers.

17. The VCI of claim 16, wherein the standardized interface is further configured to assign an IP address to the host system that is electronically connected to the first host system interface and the second host system interface.

18. The VCI of claim 16, wherein the first host system interface is configured to communicate wirelessly with the host system.

19. The VCI of claim 16, wherein the first communications protocol and the second communications protocol differ from each other.

* * * * *